(12) United States Patent
Skultety-Betz et al.

(10) Patent No.: US 7,671,596 B2
(45) Date of Patent: Mar. 2, 2010

(54) DETECTOR FOR LOCATING METALLIC OBJECTS WITH INDUCTIVELY COUPLED TRANSMIT AND RECEIVE COILS

(75) Inventors: Uwe Skultety-Betz, Leinfelden-Echterdingen (DE); Bjoern Haase, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 11/571,907

(22) PCT Filed: Aug. 4, 2005

(86) PCT No.: PCT/EP2005/053827

§ 371 (c)(1),
(2), (4) Date: Jan. 10, 2007

(87) PCT Pub. No.: WO2006/034911

PCT Pub. Date: Apr. 6, 2006

(65) Prior Publication Data

US 2008/0054892 A1    Mar. 6, 2008

(30) Foreign Application Priority Data

Sep. 29, 2004   (DE) .................. 10 2004 047 190

(51) Int. Cl.
*G01V 3/08*    (2006.01)
(52) U.S. Cl. ..................... 324/326; 324/242

(58) Field of Classification Search ...................... None
See application file for complete search history.

(56) References Cited

U.S. PATENT DOCUMENTS

| 3,882,374 | A | * | 5/1975 | McDaniel ................... 324/329 |
| 5,729,143 | A | | 3/1998 | Tavernetti et al. |
| 5,786,696 | A | | 7/1998 | Weaver et al. |
| 6,437,573 | B1 | | 8/2002 | Golder et al. |
| 6,479,990 | B2 | * | 11/2002 | Mednikov et al. ........... 324/225 |
| 2006/0164105 | A1 | * | 7/2006 | Westersten .................. 324/654 |

FOREIGN PATENT DOCUMENTS

| DE | 36 15 652 | 11/1987 |
| DE | 40 00 018 | 11/1990 |
| DE | 101 22 741 | 11/2002 |
| EP | 1 092 989 | 4/2001 |
| JP | 2001-159685 | 6/2001 |

* cited by examiner

*Primary Examiner*—Jay M Patidar
(74) *Attorney, Agent, or Firm*—Michael J. Striker

(57) ABSTRACT

A detector for locating metallic objects includes a transmit coil (116, 216) and at least two receive coils (112, 114; 212, 214), which are inductively coupled to one another; the at least two receive coils (112, 114; 212, 214) are located coaxial to one another in a plane (126, 226), and the transmit coil (116, 216) is located in a parallel plane with a height offset. Additional compensating windings (130, 132; 230, 232) of at least one of the receive coils (112, 114; 212, 214) are formed adjacent to a transmit coil (116, 216).

12 Claims, 4 Drawing Sheets

DETECTOR FOR LOCATING METALLIC OBJECTS WITH INDUCTIVELY COUPLED TRANSMIT AND RECEIVE COILS

The present invention relates to a detector for locating metallic objects.

RELATED ART

Currently, detectors for locating metallic objects hidden in construction materials typically operate using induction methods. The designs of detectors of this type are based on the fact that conductive and ferromagnetic materials influence the properties of an electromagnetic coil located nearby. The changes in the inductive properties caused by metallic objects are registered by a reception circuit of a detector of this type. In this manner, metallic objects enclosed in a wall can be located using one or more coils that are guided over the wall.

A technical difficulty encountered in the detection of metallic objects is the fact that the magnitude of the effect of the objects to be located on the coil or coils of the detector system is very small. This applies mainly with regard for the effect of non-ferromagnetic objects, e.g., copper, which is a technically important material. As a result, the inductive effect that the coils have on each other can be much greater than the induction generated in the receive coil by an enclosed object.

The detectors based on an inductive method therefore typically have a high offset, i.e., a high signal that can be tapped at the receive coil, and which can be measured even when the reception circuit is not influenced by an external, metallic object. A high offset of this type makes it difficult to detect very small inductive changes caused by a metallic object that enters the vicinity of the detector. The related art makes known sensor systems for inductive sensors and detectors that enable compensation of the signal induced by the coils themselves.

The need to detect a very small change in inductively in a very large offset signal also requires that components be used that have narrow tolerances and are therefore expensive. It also requires that extremely low-noise analogue electronics be used, which markedly increases the costs for a locating device of this type. When assembly or manufacturing tolerances are not met, or when individual components drift relative to each other, the result measured by a device of this type is inevitably corrupted.

Various approaches for handling these offset problems are made known in the related art; they all aim to reduce the sensor signal that exists when no metallic objects are present, and to thereby magnify the relative signal changes.

A multi-step approach is often employed, in which, e.g., in a first step, an assembly of sensor coils is used that is ideally capable of completely eliminating or compensating for the signal offset. The quality of the compensation that can be attained in practical application often depends, e.g., on manufacturing tolerances, however, which means an additional method of high-acuity compensation, as it were, is often required to completely eliminate the signal offset.

The known methods used to compensate manufacturing and assembly tolerances for inductive sensors in a compensation system are based essentially on the fact that the fault voltages induced in the detector system are offset by correcting the geometry of the exciting magnetic field using an adjustment process, or by generating a correction voltage signal. An example of the compensation method mentioned initially is provided in EP 1092989, and an example of the second compensation method is provided in U.S. Pat. No. 5,729,143.

Publication U.S. Pat. No. 5,729,143 makes known a detector designed to suppress the offset of the measured signal described above to the greatest extent possible. To this end, the detector described in U.S. Pat. No. 5,729,143 includes a transmit coil with a transmitter, and a receive coil with a receiver. The transmit coil and the receive coil of the detector are coupled with each other such that they partially overlap each other. The transmit coil is supplied with an alternating current by the transmitter. This current-carrying transmit coil excites—via its inductive coupling with the receive coil—a first sub-flux in the receive coil, in the overlapping area of the two coils, and it excites a second sub-flux in the remaining area of the receive coil. The distance between the centers of the transmit coil and the receive coil can now be selected such that the two sub-fluxes, which have opposite signs, compensate each other. When this is the case, and when an external, metallic object is not located near the coil assembly, the current-carrying transmit coil therefore does not induce any current in the receive coil. As such, the receiver would not measure an offset signal in this ideal case, either. The field lines generated by the transmit coil are not disturbed until the coil assembly is moved close to a metallic object; a non-disappearing flux is now induced in the receive coil, and it generates a measurement signal in the receive coil that is not influenced by an offset signal and can be evaluated by the receiver.

The relative distance between the centers of the transmit coil and the receive coil is an extremely critical parameter. As such, it takes a great deal of effort to realize the absence of an induced voltage in the receive coil—this absence being ideally assumed—in practical applications. It has been shown that adequate compensation of the flux components cannot be realized in actual series production.

For this reason, publication U.S. Pat. No. 5,729,143 provides an electronic circuit that subsequently achieves compensation in an electronic manner and therefore makes the sensor usable in practical application. The method described in U.S. Pat. No. 5,729,143 operates in a monofrequent manner. On the exciter side, a magnetic alternating field of a certain frequency f is generated, and the induced voltage components are evaluated in the detector windings with suitable analog and digital filters on a frequency-selective basis at this frequency f. The voltage U(f) induced in the detector windings by the magnetic incorrect compensation of the detector and exciter system at frequency f has a temperature-dependent amplitude and phase angle, which is also subjected to additional manufacturing tolerances. The method described in U.S. Pat. No. 5,729,143 is based on adding a correction voltage—analogous to the voltages induced in the detector windings—the amplitude and phase angle of which exactly compensates the fault voltage U(f) at working frequency f. To this end, a microprocessor generates a digital correction signal—the phase and amplitude of which are controlled—at frequency f. The amplitude and phase angle required for the compensation depends on the phase shift, which is caused by the components of the circuits in the excitation and detector branch. The required correction signal is therefore also subjected to a temperature drift, among other things. In order to also compensate the fault voltage U(f) when the working temperature changes, the microprocessor must track the phase angle and amplitude of the correction signal as a function of temperature. To this end, it is usually necessary for the user to perform recalibration.

An alternative method for balancing a magnetic incorrect compensation is made known in EP 1092989 A1. With this method, corrective magnetic fields are used, instead of adding a correction voltage to the detection voltage induced in the detector windings. To this end, the system of magnetic field excitation is composed of the primary excitation coil and additional trimming windings and "correcting windings". The difference between a trimming winding and a correcting winding is that correcting windings are connected in series with the primary excitation coil and therefore always carry the same current, while trimming windings can carry an adjustable portion of the current flowing in the correction and excitation coils. In this manner, it is possible to ensure that induced voltage does not occur in the detector coils when there are no metallic objects located near the sensor. The method described in publication EP 1092989 A1 depends much less on component tolerances and drifts in the transmit and reception circuits. Moreover, the measurement is not limited to a selected working frequency, since the compensation is largely independent of the frequency used. In comparison, the design of a sensor according to EP 1092989 A1 becomes much more complex. While the sensor described in U.S. Pat. No. 5,729,143 functions with only one coil each for the transmission and reception circuits, the design described in EP 1022989 A1 requires ten coils in the excitation path and four coils for the detector path. Publication DE 101 22 741 A1 makes known a detector for locating metallic objects, which includes a receive coil and a first transmit coil, which are inductively coupled with each other. To ensure that the smallest possible offset signal occurs in the detector, a second transmit coil is provided, which is also inductively coupled with the receive coil. The receive coil and the two transmit coils are located concentric to each other on a common axis. In terms of the number of turns and/or their dimensions, the two transmit coils are sized such that fluxes induced by the two transmit coils in the receive coil compensate each other.

With the devices described in the related art, however, the sensor must be calibrated before a locating measurement is started. In the calibration procedure, the offset is measured without any external metallic objects present. The deviation from this reference value is subsequently used as an indicator for the presence of metallic objects. This time-consuming calibration process also has the potential for considerable error and damage if a user does not perform it properly.

Based on the detectors described in the related art, the present invention is based on the object of providing a detector of the type described initially that produces the smallest possible offset signal, and with which the offset is affected as minimally as possible if the coils are placed in the wrong positions.

A further object of the present invention is to realize a sensor geometry, the properties of which change only slightly with ambient temperature, so that good measured results can also be attained with a detector of this type without the use of calibration processes.

SUMMARY OF THE INVENTION

The inventive detector for locating metallic objects includes a transmit coil and at least two receive coils that are inductively coupled to one another. The at least two receive coils are located coaxial to each other, in a plane. The third coil—that functions as a transmit coil—is located in a parallel, second plane that is offset relative to the transmit coil, i.e., it is displaced in the z direction. Compensation windings of at least one receive coil are formed adjacent to it, i.e., in the vicinity of the transmit coil.

The number and position of the particular compensation windings are dimensioned such that the dependence of the voltage induced in the detector coil system on a vertical mis-positioning of the excitation coil, i.e., in the z direction, is compensated as exactly as possible. A slight mis-positioning of the excitation coil in the z direction therefore does not affect the total voltage induced in the receive windings.

With a detector geometry of this type, the tolerance sensitivity in terms of the positioning of the excitation coil vertically (in the z direction) over the plane of the receive coils is reduced considerably. In addition to the receive windings of the receive coil in the outer region of the transmit coil, the compensation windings are located directly under the excitation coil.

With a particularly advantageous embodiment of the inventive detector, the compensation coils are located with a height offset in the z direction, and, in particular, they are located underneath the transmit coil.

To exactly adjust the compensation of the voltages induced in the two detection coils, it is necessary to take into account the fact that the detector coils not only have an inductive effect, they also have a non-disappearing capacitance per unit length. Detector coils for locating devices are typically manufactured using enameled copper wire. The thickness of the insulating coating composition is typically in the magnitude of only a few micrometers. When two windings are located next to each other, inductively therefore results, and the adjacent windings also function as a capacitor to a certain extent. Due to the minimal thickness of the insulation that exists when enamelled wire is used, the parasitic capacity can reach significant levels. This is the case in particular with coils wound in multiple layers. Since it is important that it be possible to determine inductively at levels of only a few ppm in order to realize optimal compensation geometries, the capacitive influence cannot be disregarded even when frequencies of only a few kHz are used. It should be noted that the currents that are closed via the parasitic capacitors are upwardly transformed in the other windings and can therefore result, in sum, in a significant level of interference voltage. The parasitic capacitance is exposed to a significant temperature drift, since the dielectric constant of the insulating coating composition is not thermally stable. This is the case, in particular, when a "stoving lacquer" is used.

The disturbing capacitance effect can be reduced considerably, e.g., by not using lacquer to insulate the individual copper windings, but rather by using other insulating means that are suitable and, mainly, thicker. Paper, cotton, and insulation plastics, as are used with cables, appear to be particularly suitable.

Advantageously, the receive coils are designed planar in shape, i.e., they have a single-layer turn geometry. This makes it possible to easily reduce the capacitance per unit length of the two receive and detector coils. Due to the planar, single-layer turn geometry, it is possible to keep the distance from turn to turn great and, therefore, to keep the parasitic capacitance per unit length of the coil turn small. It also ensures that the remaining capacitance per unit length is thermally invariant, so that a temperature drift of the parasitic capacitance of the coil cannot occur.

In a particularly advantageous embodiment of the inventive detector, the receive coils are designed as printed circuit coils on the printed circuit board of a printed circuit. In this case, no additional costs are incurred to manufacture the detector coils. In addition to the fact that costs are nearly eliminated, the design of the two detector coils as printed conductor structures on a printed circuit board has the advantage that the dimensional tolerance of the windings is very low. Technically, it is not a problem to manufacture copper structures on printed circuit boards with an accuracy of up to 25 micrometers.

In an advantageous refinement of the inventive detector, the compensating windings of the receive coils are formed on two diametrically opposed lateral surfaces of a printed circuit board. The compensating windings, which are wound in the clockwise and counterclockwise directions, are installed on two sides of the printed circuit board. Given that the inner pairs of compensating windings have practically the same radius, the directional pattern of the detector is not corrupted when the distances to metallic objects are great. In this manner it is possible to locate the compensating windings below the excitation coil without corrupting the directional pattern of the inductive sensor.

The transmit coil of the inventive detector is advantageously mounted on a bobbin, which is subsequently secured on the printed circuit board during assembly, e.g., via soldering or by clipping it into place. The windings of the excitation coil are therefore located at a certain, defined height above the printed circuit board and, therefore, above the plane of the receive coils. The bobbin on which the windings of the transmit coil are mounted therefore also serves, advantageously, as a spacer for the transmit coil or its windings relative to the receive coils, and therefore ensures that there is a defined distance between the transmit and receive coils. In a particularly advantageous manner, the excitation coil is contacted electrically via contact pins inserted in an injection-molded part, the contact pins having been soldered in holes in the printed circuit board provided for this purpose. To enable stable mechanical contacting, it is helpful to use more than the two contact pins that are required for electrical purposes, and, e.g., to also provide one or two blind pins, i.e., pins that are not electrically contacted. In this manner, the excitation coil can also be fixed in position with mechanical precision using a soldering process.

In addition, this wound excitation coil does not react in a sensitive manner to mis-positionings. As a result, the tolerance requirements for manufacturing and assembling the detector can be reduced in this regard.

A detector for locating metallic objects that has the inventive sensor geometry therefore advantageously requires only one single wound and, therefore, expensive, excitation coil, thereby rendering further wound sensor coils unnecessary. The inventive detector also has a good directional effect of detection and exhibits only a very slight drift behavior in the presence of temperature changes. The inventive sensor geometry with the advantages described therefore makes possible a detector, in particular, that delivers good measured results without the need to perform calibration on a regular basis.

In addition, a detector device of this type can be integrated in or on a tool machine, e.g., a drilling tool, to allow the user of this machine to drill reliably. For example, the sensor can be integrated in a drilling or chiseling tool, or it can be designed as a module capable of being connected with a tool of this type. Advantageously, the inventive sensor can be installed in a suction device for dust that is connected to or connectable with the tool machine, and that is used near a wall to be worked on.

BRIEF DESCRIPTION OF THE DRAWINGS

Exemplary embodiments of the inventive detector are depicted in the drawing and are described in greater detail in the description below. The figures in the drawing, their descriptions, and the claims contain numerous features in combination. One skilled in the art will also consider these features individually and combine them to form further reasonable combinations that are therefore also disclosed in the description.

DETAILED DESCRIPTION OF THE EXEMPLARY EMBODIMENTS

Figure 1:
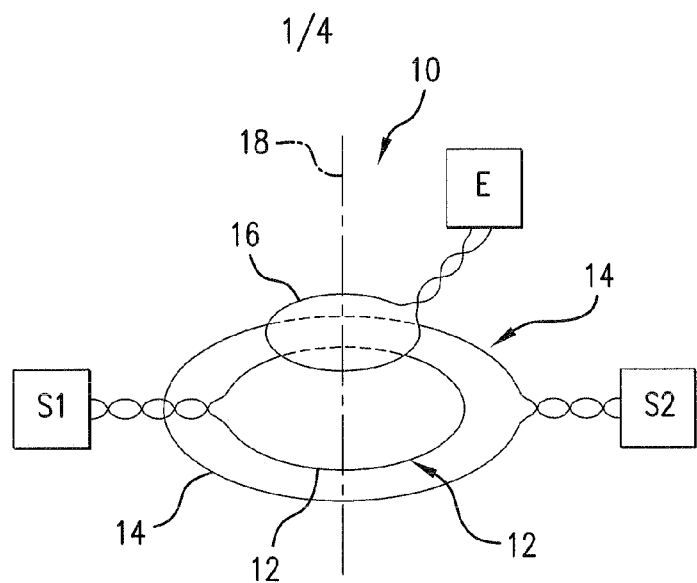
FIG. 1 shows the basic design of a sensor geometry of a detector for locating metallic objects based on the related art, in a schematic illustration.

FIG. 1 shows the basic design of a detector for locating metallic objects, according to the related art. In sensor geometry 10 of a detector of this type, there are three coils on a first transmit coil 12, which is connected to a first transmitter S1, a second transmit coil 14, which is connected to a second transmitter S2, and a receive coil 16, which is connected to a receiver E. Each coil is depicted as a circular line in this case. The special aspect of the arrangement of these three coils 12, 14, 16 is the fact that they are all located concentrically around a common axis 18. Individual coils 12, 14, 16 have different outer dimensions, so that coil 12 can be inserted in coil 14 coaxially to axis 18.

The two transmit coils 12 and 14 are supplied by their transmitters S1 and S2 with alternating currents with phase opposition. First transmit coil 12 therefore induces a flux in receive coil 16 that is oriented in the opposite direction from the flux induced by second transmit coil 14 in receive coil 16. The two fluxes induced in receive coil 16 compensate each other. As such, receiver E does not detect a receive signal in receive coil 16 if an external, metallic object is not located near coil assembly 10. Flux φ excited by individual transmit coils 12 and 14 in receive coil 16 depends on various variables, e.g., the number of turns and the geometry of coils 12 and 14, and on the amplitude of the currents supplied to the two transmit coils 12 and 14, and on the mutual phase angle of these currents.

With the detectors according to the related art, these variables must ultimately be optimized such that, if a metallic object is not located in receive coil 16, either no flux or the smallest possible flux φ is induced when current flows through transmit coils 12 and 14. With coil assembly 10 shown in FIG. 1, first transmit coil 12, which is connected to first transmitter S1, and a second transmit coil 14, which is connected to a second transmitter S1, are located coaxially relative to each other in the same plane. Receive coil 16 is located in a plane that is shifted relative to the two transmit coils 12 and 14.

Figure 2:
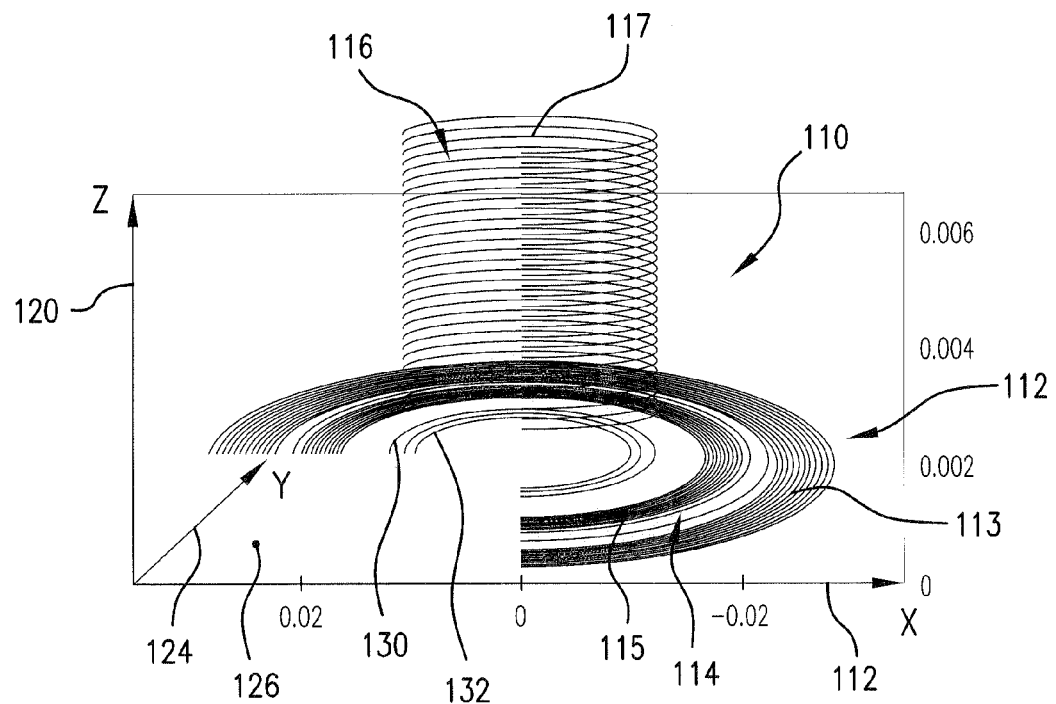
FIG. 2 shows an initial exemplary embodiment of the coil assembly of the inventive detector in a simplified illustration.

FIG. 2 shows a first exemplary embodiment of a sensor geometry 110 of an inventive detector for locating metallic objects. This optimized design for a sensor geometry reduces the tolerance sensitivity with regard for the vertical positioning of the excitation coil. Sensor geometry 110 shown in FIG. 2 includes two receive coils 112 and 114 that are located coaxially relative to each other in common plane 126. A sensor coil 116 is located a certain distance z above this common receive plane 126, sensor coil 116 also being located coaxially to receive coil 112 and receive coil 114.

Receive coils 112 and 114 have a planar, single-layer turn geometry. A design of receive coils 112, 114 of this type makes it possible to easily reduce the capacitance per unit length of the two receive coils. It is possible to keep the distance from turn to turn great and, therefore, to keep the parasitic capacitance per unit length of the coil turn small. To insulate the individual copper turns, it is possible, e.g., to not use lacquer, as is typically used, but rather to use suitable other—mainly thicker—insulation means. In particular, paper and insulation plastics, as used with cables, appear to be suitable. A further method for reducing the capacitance per unit length is to use multiple-chamber turns for coils 112 and 114.

When a planar geometry is used, it is also possible, in particular, to realize the two receive coils 112 and 114 as printed circuit coils on the printed circuit board of a printed circuit. In this case, no significant costs are incurred to manufacture the two receive coils. In addition to eliminating costs, the configuration of the two receive coils 112 and 114 as printed conductor structures on a printed circuit board has the advantage that the dimensional tolerance of the turns is very low. Technically, it is not a problem to manufacture copper structures exactly on printed circuit boards up to 25 micrometers.

A design of this type is depicted schematically in FIG. 2. To enhance clarity, z-axis 120 is stretched relative to x- and y-axes 122 and 124. To elucidate this depiction, numerical values are provided on the particular axes. The numerical values are not absolute values. They merely represent the relative magnitude of the scale of the individual axes in this exemplary embodiment using random units. To show the cross sections more clearly, a segment of each of the coils has been removed in FIG. 2.

The two detector coils 112 and 114 lie in a plane 126 that is intended to symbolize a not-shown printed circuit board, and that passes through x-axis 122 and y-axis 124 in FIG. 2. Plane 126 can correspond, e.g., to the top side or underside of the printed circuit board. Turns 115 of receive coil 114 are wound, e.g., in the clockwise direction, while further outwardly lying turns 113 of receive coil 112 are oriented in the counterclockwise direction. The voltages induced in turns 113, 115 therefore have opposite signs and, provided the dimensioning is suitable, they compensate each other entirely when no external metallic objects are present.

An excitation and/or transmit coil 116 is located above plane 126 of the printed circuit board, i.e., in z-direction 120. It is particularly advantageous when the transmit coil is manufactured on a bobbin, which is then soldered onto printed circuit board 126. Turns 117 of transmit coil 116 are therefore located at a certain, predefined height z above plane 126 of the printed circuit board. Due to the stability required, it is crucial that bobbins be manufactured with wall thicknesses of less than one millimeter. For this reason, the objective is for the distances between the printed circuit board and transmit coil 116 to be at least one millimeter wide.

With the design shown in FIG. 2, a mis-positioning of transmit coil 116 in the radial, i.e., x- and y-directions 122 and 124, is less significant than has been demonstrated in the related art, e.g., in DE 10122741A1. To further compensate mis-positionings in z direction 120, inventive sensor geometry 110 according to FIG. 2 includes compensating windings 130 and 132 located directly underneath transmit coil 116, in addition to receive windings 115 and 113 known from the related art and that are located in the outer region of the sensor. In the exemplary embodiment depicted in FIG. 2, these compensating windings are composed of two windings 132 in the clockwise direction, and a winding 130 in the counterclockwise direction. The compensating effect can also be optimized by adjusting the radii of compensating windings 130 and 132. The number and position of the compensating windings are dimensioned such that the dependence of the voltage induced in receive coil system 114 with receive windings 115 and compensating windings 130, and in receive coil system 112 with receive windings 113 and compensating windings 132, is compensated with regard for a mis-positioning of transmit coil 116 in z direction 120. Compensating windings 130 and 132 are located underneath transmit coil 116 in the same plane 126 as receive coils 112 and 114, with which they are coaxial. The radii of compensating windings 130 and 132 are therefore selected to be different from but smaller than the radii of receive coils 112 and 114, so that compensating windings 130 and 132 are located nearly underneath transmit coil 116. As a result, the compensating windings can also be realized as printed structures on the same printed circuit board. Radii for compensating coils 130 and 132 can also be larger or smaller than the radius of windings 117 of transmit coil 116.

This compensation takes place by the fact that the lesser influence—due to the greater distance—of the mis-positioning of transmit coil 116 on winding system 113 of receive coil 112 is compensated by the fact that receiver compensating windings 132 of receive coil 112 are also located very closely underneath transmit coil 116. Compensating windings 132 are influenced that much more by a displacement of transmit coil 116. A slight mis-positioning of transmit coil 116 therefore no longer affects the total amount of voltage induced in the receive windings, that is, including in their compensating windings 130 and 132. Ideally, of course, this applies only for a narrow window in the region of the z position of transmit coil 116 that is actually provided. The requirement on the manufacturing tolerance of the wall thickness of a bobbin for transmit coil 116 can therefore be reduced, e.g., to +/−0.1 mm, which is realizable.

Figure 3:
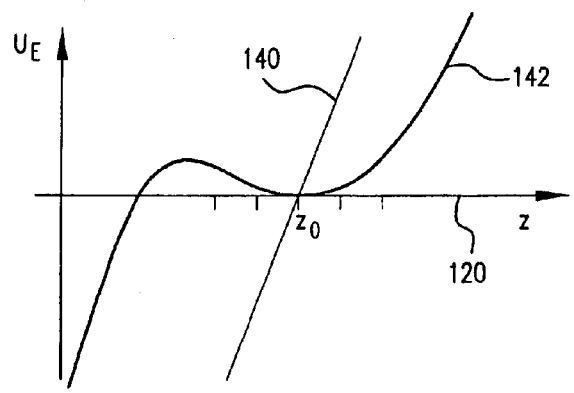
FIG. 3 shows a schematized depiction of the functional relationship of the voltage $U_E$ induced in the receiver system, as a function of position z of the transmit coil above the plane of the receive coils.

This relationship is depicted schematically in FIG. 3; it shows voltage $U_E$ induced in the receiver system as a function of position z of transmit coil 116 above plane 126 of the printed circuit board. Curve 140 shows the change in the induced voltage in the receiver circuit as a function of the displacement of the transmit coil in the case of a sensor geometry without compensating windings according to the present invention. Curve 142 shows the basic graph of this functional dependence with an optimized number and position of compensating windings for the receiver system according to the present invention. Induced voltage $U_E$ has a local minimum as a function of z position 120 of transmit coil 116 in the region of intended position $z_0$ of transmit coil 116. This results in a greatly reduced tolerance requirement for the positioning of transmit coil 116 in the z direction. The greater ease of manufacture for a sensor geometry 110 according to the exemplary embodiment depicted in FIG. 2 attained in this manner is offset, however, by the fact that the directional pattern of the inductive sensor is negatively affected by the addition of compensating windings 130 and 132 underneath excitation coil 116.

Figure 4:
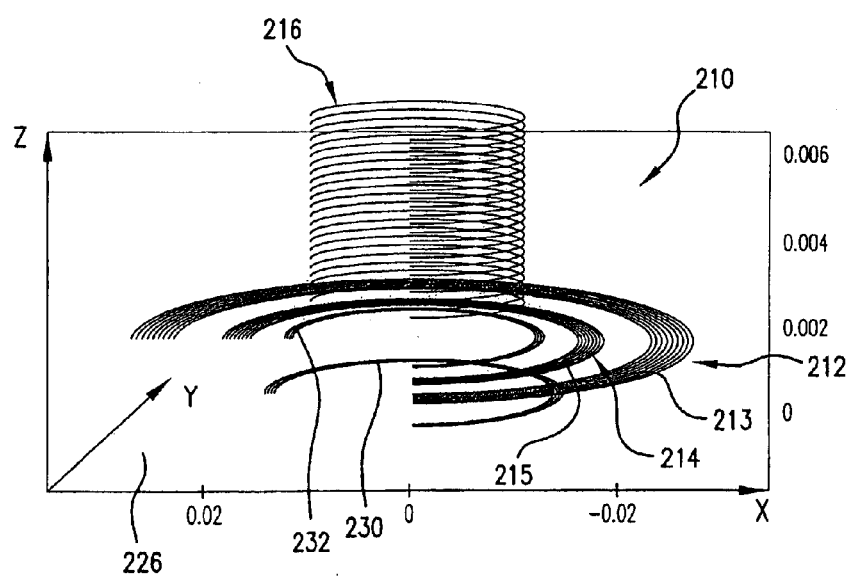
FIG. 4 shows a second exemplary embodiment of the coil assembly of the inventive detector in an illustration analogous to FIG. 2.
Figure 5:
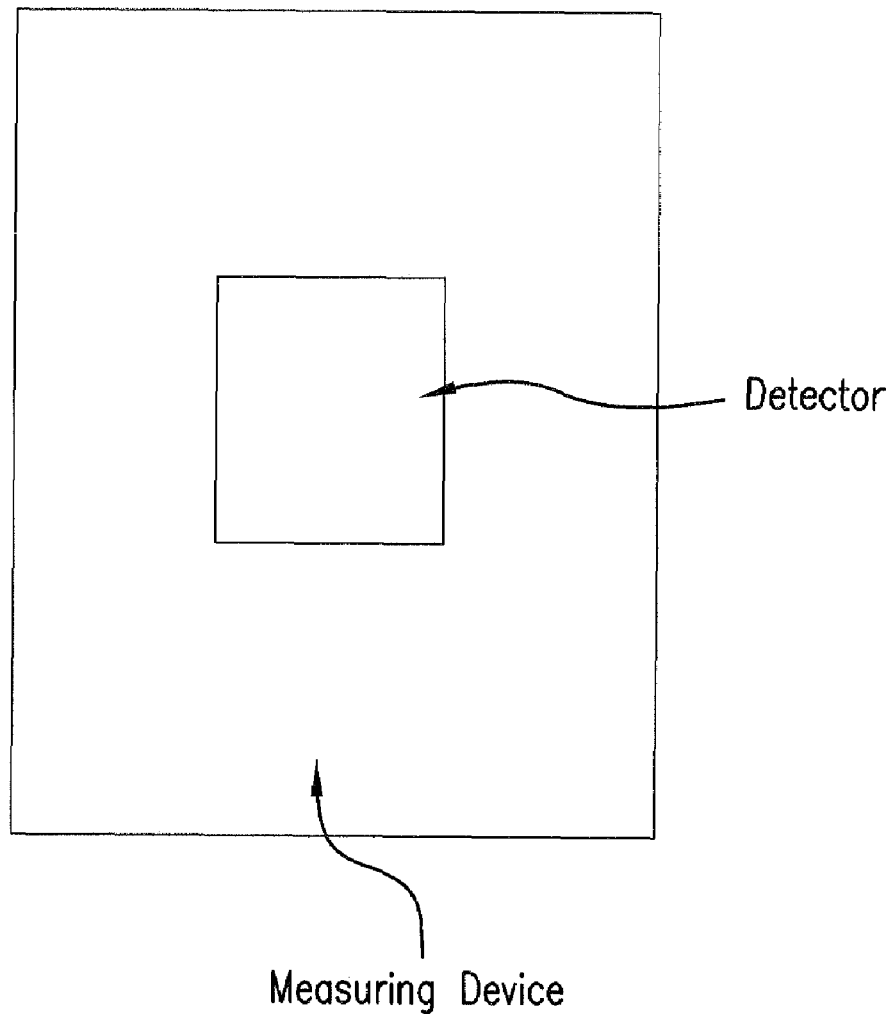
FIG. 5 shows a measuring device with a detector for locating metallic objects in accordance with the present invention.
Figure 6:
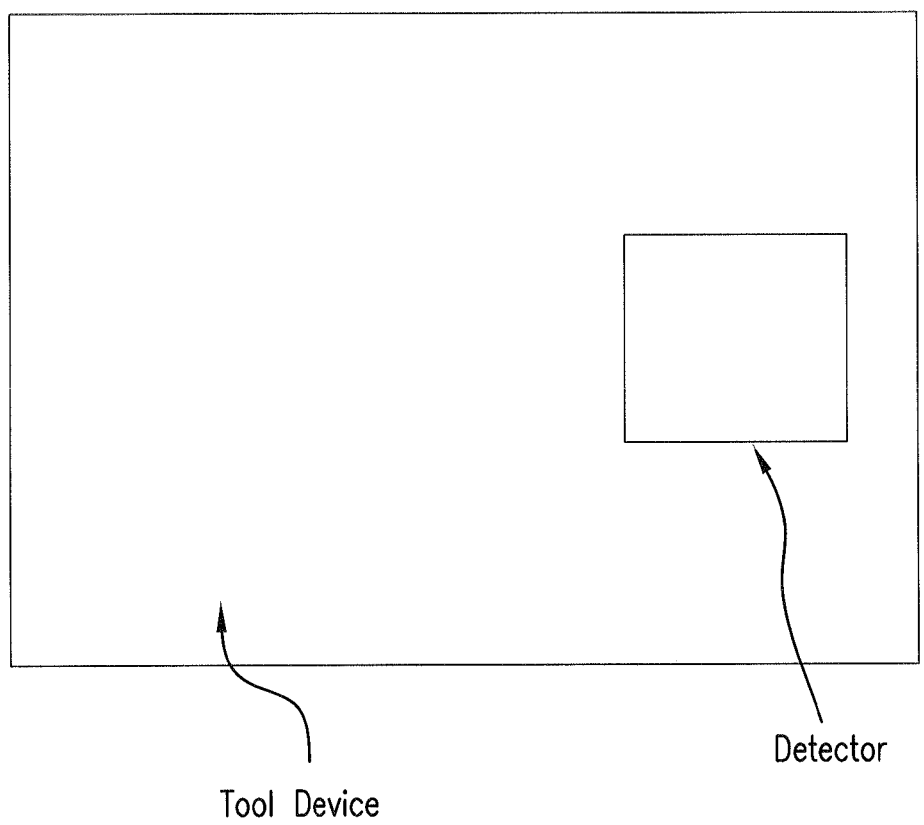
FIG. 6 shows a tool device with a detector for locating metallic objects in accordance with the present invention.

FIG. 4 shows—in an alternative exemplary embodiment of a sensor geometry 210 for the inventive detector for locating metallic objects—a compensating design that greatly improves the problem of the corrupted directional pattern. With this exemplary embodiment, compensating windings 230 and 232—which are wound in the clockwise and counterclockwise directions, respectively—are installed on two different sides, e.g., of a printed circuit board, as indicated by plane 226. A printed circuit board of this type must therefore be designed with at least two layers. Given that the inner pairs of compensating windings can be designed with practically the same radius, the directional pattern of the sensor is no longer corrupted when the distances to metallic objects are great. Since the radius of compensating windings 230 and 232 is now nearly equal, their particular number of turns is used to enable an optimized adjustment of the positioning tolerance for transmit coil 216.

The improved directional pattern of the inventive detector depicted in FIG. 4 can be explained clearly using the following qualitative argument. If current would be supplied to receiver windings 215 and 230 or 213 and 232, an erroneous pattern would be generated by compensating windings 230 and 232 located inwardly and distributed on the top side and underside of printed circuit board 226, the erroneous pattern closely approximating a magnetic quadrupole. The field therefore disappears very quickly as distance increases, at intervals that are great compared with the two compensating winding systems 230 and 232 on the top side and underside of printed circuit board 226. Even at a distance of approximately one centimeter from the printed circuit board, inner compensating windings 230 and 232 no longer make a noticeable contribution to the overall magnetic field. These considerations, which pertain to the application of the receive windings to produce a magnetic field, can also be applied to the resultant reception characteristics.

While compensating windings 230 and 232 according to FIG. 4 result in an only slight deformation of the reception characteristics, their influence on the voltage induced in receive windings 215 and 213 is significant.

Transmit coil 216 is located approximately 1 mm above the printed circuit board; this distance is nearly as great as the thickness of the printed circuit board itself.

By using these compensating measures, it is possible to reduce the requirements on the mechanical tolerances of the bobbin of the excitation coil even further. In a particularly advantageous manner, the excitation coil is contacted electrically via contact pins inserted in an injection-molded part, the contact pins have been soldered in holes in the printed circuit board of the detector provided for this purpose. To enable stable mechanical contacting, it is helpful to use more than the two contact pins that are required for electrical purposes, and, e.g., to also provide one or two blind pins, i.e., pins that are not electrically contacted. In this manner, the excitation coil can also be fixed in position with mechanical precision in the soldering process.

Advantageously, as a result of the inventive detector for locating metallic objects with the detector geometries presented, only one single wound and, therefore, expensive, transmit coil is required. Any additional, wound transmit coils would therefore be superfluous. The sensor geometry presented also makes possible a good directional effect of detection while greatly reducing the requirements on the manufacturing tolerances with regard for a mis-positioning of the transmit coil, in particular. Due to the inventive design of the sensor geometry, the inventive detector for locating metallic objects yields good measured results, even without the use of a calibration process.

The inventive detector for locating metallic objects is not limited to the exemplary embodiments shown in the figures.

In particular, the inventive detector is not limited to circular coils. In deviation from the coil designs shown in the figures, every coil or individual coils can have a non-circular shape, and they can be composed of one or more windings.

The inventive detector for locating metallic objects is not limited to the use of a transmit coil and two receive coils.

What is claimed is:

1. A detector for locating metallic objects, comprising:
   a transmit coil (116, 216) and at least two receive coils (112, 114; 212, 214) that are inductively coupled to one another, wherein the at least two receive coils (112, 114; 212, 214) are located coaxial to one another in a first plane (126, 226), and the transmit coil (116, 216) is located in a second, parallel plane with a height offset relative to said first plane,
   at least two compensating windings (130, 132; 230, 232) located coaxially to the transmit coil and the receive coils are formed so that one of the two compensating windings is axially offset from the transmit coil for compensating mis-positioning of the transmit coil.

2. The detector as recited in claim 1, wherein the number and position of compensating windings (130, 132; 230, 232) are dimensioned such that dependence of voltage $U_E$ induced in the receive coils (112, 114; 212, 214) on a vertical mis-positioning ($\Delta z$) of the transmit coil (116, 216) is compensated for exactly.

3. The detector as recited in claim 1, wherein the compensating windings (130, 132; 230, 232) are positioned with a height offset relative to the transmit coil (116, 216).

4. The detector as recited in claim 1, wherein the compensating windings (130, 132; 230, 232) are designed as printed circuit coils on a printed circuit board (126, 226).

5. The detector as recited in claim 1, wherein the receive coils (112, 114; 212, 214) are designed planar in shape.

6. The detector as recited in claim 1, wherein the receive coils (112, 114; 212, 214) are designed as printed circuit coils on a printed circuit board (126, 226).

7. The detector as recited in claim 1, wherein the compensating windings (130, 132; 230, 232) are formed in two planes that are positioned with a height offset relative to each other.

8. The detector as recited in claim 7, wherein the compensating windings (130, 132; 230, 232) are formed on two diametrically opposed lateral surfaces of a printed circuit board (126, 226).

9. The detector as recited in claim 1, wherein the compensating windings (130, 132; 230, 232) have essentially the same radius.

10. A measuring device, in particular a hand-held locating detector, with at least one device as recited in claim 1.

11. A tool device, in particular a drilling or chiseling tool, with the detector as recited in claim 1.

12. A detector for locating metallic objects, comprising:
    a transmit coil (116, 216) and at least two receive coils (112, 114; 212, 214) that are inductively coupled to one another, wherein the at least two receive coils (112, 114; 212, 214) are located coaxial to one another in a first plane (126, 226), and the transmit coil (116, 216) is located in a second, parallel plane with a height offset relative to said first plane,
    at least two compensating windings (130, 132; 230, 232) located coaxially to the transmit coil and the receive coils are formed so that one of the two compensating windings is axially offset from the transmit coil,
    wherein the number and position of compensating windings (130, 132; 230, 232) are dimensioned such that dependence of voltage $U_E$ induced in the receive coils (112, 114; 212, 214) on a vertical mis-positioning ($\Delta z$) of the transmit coil (116, 216) is compensated for exactly.

* * * * *